United States Patent
Reid et al.

(10) Patent No.: US 11,430,344 B2
(45) Date of Patent: Aug. 30, 2022

(54) AIRCRAFT POSITION-BASED AIR TURBULENCE DETECTION SYSTEMS AND METHODS

(71) Applicant: THE BOEING COMPANY, Chicago, IL (US)

(72) Inventors: Katie M. Reid, Morrison, CO (US); Jendrick Westphal, Hessen (DE); Karol Rydzewski, Pomorze (DE)

(73) Assignee: THE BOEING COMPANY, Chicago, IL (US)

( * ) Notice: Subject to any disclaimer, the term of this patent is extended or adjusted under 35 U.S.C. 154(b) by 290 days.

(21) Appl. No.: 16/030,225

(22) Filed: Jul. 9, 2018

(65) Prior Publication Data
US 2020/0013300 A1  Jan. 9, 2020

(51) Int. Cl.
*G08G 5/00* (2006.01)
(52) U.S. Cl.
CPC ......... *G08G 5/0091* (2013.01); *G08G 5/0004* (2013.01); *G08G 5/0017* (2013.01)
(58) Field of Classification Search
CPC .......... G01W 2001/003; G08G 5/0017; G08G 5/0021; G08G 5/0026; G08G 5/0004; G08G 5/0013; G01S 13/953
See application file for complete search history.

(56) References Cited

U.S. PATENT DOCUMENTS

| | | | | |
|---|---|---|---|---|
| 4,155,525 A | * | 5/1979 | Peter-Contesse | G05D 1/063 244/182 |
| 5,173,704 A | | 12/1992 | Buehler et al. | |
| 5,746,392 A | * | 5/1998 | Gast | B64C 13/16 244/76 B |
| 6,828,923 B2 | | 12/2004 | Anderson | |
| 7,592,955 B2 | | 9/2009 | Tillotson et al. | |
| 7,598,901 B2 | | 10/2009 | Tillotson et al. | |
| 7,889,328 B2 | | 2/2011 | Tillotson | |
| 8,130,121 B2 | | 3/2012 | Smith et al. | |
| 8,209,071 B2 | | 6/2012 | Ross | |
| 8,320,630 B2 | | 11/2012 | Tillotson | |
| 8,339,583 B2 | | 12/2012 | Tillotson | |
| 8,825,235 B2 | | 9/2014 | Block | |
| 9,068,884 B1 | | 6/2015 | Tillotson | |
| 9,243,922 B2 | | 1/2016 | Watts | |
| 9,736,433 B2 | | 8/2017 | Tillotson | |
| 9,881,507 B2 | | 1/2018 | Rencher et al. | |

(Continued)

OTHER PUBLICATIONS

Krozel, Remote Detection of Turbulence via ADS-B, Jan. 5, 2015, AIAA SciTech Forum, AIAA Guidance, Navigation, and Control Conference, Kissimmee, Florida (Year: 2015).*

(Continued)

*Primary Examiner* — Christian Chace
*Assistant Examiner* — Scott R Jagolinzer
(74) *Attorney, Agent, or Firm* — The Small Patent Law Group LLC; Joseph Butscher

(57) ABSTRACT

An air turbulence analysis system and method includes an air turbulence control unit that is configured to receive a position signal from an aircraft within an air space. The air turbulence control unit determines a location of air turbulence within the air space based on the position signal. In at least one embodiment, the position signal is an automatic dependent surveillance-broadcast (ADS-B) signal.

25 Claims, 5 Drawing Sheets

(56) References Cited

U.S. PATENT DOCUMENTS

| | | | |
|---|---|---|---|
| 10,017,272 B1* | 7/2018 | Olivo | G08G 5/0091 |
| 10,055,998 B1* | 8/2018 | Reinke | G08G 5/0013 |
| 2005/0278120 A1* | 12/2005 | Manfred | G01W 1/10 |
| | | | 702/2 |
| 2006/0121893 A1* | 6/2006 | Tillotson | G01P 5/001 |
| | | | 455/431 |
| 2007/0159383 A1* | 7/2007 | Fleming | G01S 19/14 |
| | | | 342/357.52 |
| 2008/0119971 A1* | 5/2008 | Deker | G08G 5/0091 |
| | | | 701/9 |
| 2008/0255714 A1* | 10/2008 | Ross | G08G 5/0091 |
| | | | 701/14 |
| 2010/0315265 A1* | 12/2010 | Smith | G08G 5/0013 |
| | | | 340/963 |
| 2011/0257818 A1 | 10/2011 | Ganz et al. | |
| 2012/0259549 A1* | 10/2012 | McDonald | G01W 1/00 |
| | | | 702/3 |
| 2014/0074326 A1* | 3/2014 | Pereira | B64D 45/00 |
| | | | 701/14 |
| 2018/0155052 A1* | 6/2018 | Lacroix | H04B 7/18506 |
| 2018/0276475 A1* | 9/2018 | Podradchik | G06K 9/3208 |

OTHER PUBLICATIONS

Kopec et al., Retrieving atmospheric turbulence information from regular commercial aircraft using Mode-S and ADS-B, May 23, 2016, Atmospheric Measurement Techniques (Year: 2016).*

Vrancken et at. "Clear Air Turbulence Detection and Characterisation in The Delicat Airborne Lidar Project" 25th International Laser Radar Conference, 2010; 4 pages.

"ADS-B Frequently Asked Questions (FAQs)" Federal Aviation Administration, 2018; 10 pages.

Jacek M. Koec et al: "Retrieving atmospheric turbulence information from regular commercial aircraft using Mode-S and ADS-B", Atmospheric Measurement Techniques, vol. 9, No. 5, May 23, 2016, pp. 2253-2265.

Jimmy Krozel et al: "Remote Detection of Turbulence via ADS-B", AIAA Guidance, Navigation, and Control Conference 2015, Kissimmee, Florida, USA, Jan. 5-9, 2015; held at at the AIAA Scitech Forum 2015, Jan. 8, 2015.

Extended European Search Report for EP 19185203.7-1203, dated Nov. 7, 2019.

"Aviation Turbulence: Processes, Detection, Prediction," Sharman, et al., Springer 2017, pp. 97-121 and 213-261.

* cited by examiner

AIRCRAFT POSITION-BASED AIR TURBULENCE DETECTION SYSTEMS AND METHODS

FIELD OF THE DISCLOSURE

Embodiments of the present disclosure generally relate to systems and methods of detecting air turbulence within an air space.

BACKGROUND OF THE DISCLOSURE

Aircraft are used to transport passengers and cargo between various locations. Each aircraft typically flies between different locations according to a defined flight plan. During a flight, an aircraft may experience air turbulence, which may cause a variation in the flight plan. For example, during periods of air turbulence, a pilot may ascend, descend, or re-route an aircraft to leave or otherwise avoid the air turbulence.

General locations of likely air turbulence may be predicted through weather reports. Based on meteorological forecasts, predictions are made as to where air turbulence may arise. However, the meteorological forecasts may not be completely accurate, and may not accurately locate air turbulence within an air space.

Further, pilots flying aircraft may report to air traffic control locations of air turbulence. For example, a pilot flying through air turbulence may contact air traffic control to report the air turbulence. As can be appreciated, however, perceptions of motion caused by air turbulence may vary. Also, pilots may be reluctant to report locations of air turbulence, such as if they believe reporting the air turbulence may cause air traffic control to alter flight plans of other aircraft (which may, for example, increase flight times for other flights). Further, air turbulence may cause different motion in different types of aircraft. As an example, a large aircraft may not be as affected by air turbulence as compared to a smaller aircraft.

In short, determinations of air turbulence may be imprecise and subjective. Accordingly, flights may inadvertently pass through air turbulence, or re-route in in relation to a flight plan when at least portions of the original flight plan would generally not be affected by air turbulence.

SUMMARY OF THE DISCLOSURE

A need exists for a system and method that accurately and timely determine locations of air turbulence within an air space. Further, a need exists for an objective system and method of determining air turbulence within an air space that does not solely rely on weather forecasts or subjective opinions regarding air turbulence.

With those needs in mind, certain embodiments of the present disclosure provide an air turbulence analysis system that includes an air turbulence control unit that is configured to receive a position signal from an aircraft within an air space. The air turbulence control unit determines a location of air turbulence within the air space based on the position signal. In at least one embodiment, the position signal is an automatic dependent surveillance-broadcast (ADS-B) signal.

In at least one embodiment, the air turbulence control unit determines the location of air turbulence within the air space based on detected changes in one or more position parameters of the position signal over time. The position parameter(s) include one or more of speed, altitude, and heading.

For example, the position parameters may include speed. The air turbulence control unit determines that the aircraft is flying through air turbulence in response to a change in speed of the aircraft exceeding a predetermined speed change threshold.

As another example, the position parameters may include altitude. The air turbulence control unit determines that the aircraft is flying through air turbulence in response to a change in altitude of the aircraft exceeding a predetermined altitude change threshold.

As another example, the position parameters may include heading. The air turbulence control unit determines that the aircraft is flying through air turbulence in response to a change in heading of the aircraft exceeding a predetermined heading change threshold.

As another example, the position parameters include speed, altitude, and heading. The air turbulence control unit determines that the aircraft is flying through air turbulence in response to two or more of a change in speed of the aircraft exceeding a predetermined speed change threshold, a change in altitude of the aircraft exceeding a predetermined altitude change threshold, and a change in heading of the aircraft exceeding a predetermined heading change threshold.

The air turbulence analysis system may also include an aircraft database that stores aircraft data for the aircraft. The air turbulence control unit correlates the position signal with the aircraft data to normalize the position signal. The air turbulence control unit may categorize a severity of the location of air turbulence based on the position signal that is correlated with the aircraft data.

In at least one embodiment, the air turbulence control unit is configured to receive a flight control signal from the aircraft. The air turbulence control unit analyzes the flight control signal to assess the location of the air turbulence. The flight control signal may be indicative of a pilot action that caused a change in at least one position parameter of the position signal. The flight control signal may be indicative of an autopilot device operation that corrected a change in at least one position parameter of the position signal.

In at least one embodiment, the air turbulence control unit compares the position signal to a flight plan of the aircraft.

The air turbulence control unit may receive a motion signal from one or more motion sensors of the aircraft. The air turbulence control unit analyzes the flight control signal to assess the location of the air turbulence.

The air turbulence control unit may receive weather data from a weather reporting unit. The air turbulence control unit analyzes the weather data to assess the location of the air turbulence.

Certain embodiments of the present disclosure provide an air turbulence analysis method that includes receiving, by an air turbulence control unit, a position signal from an aircraft within an air space, and determining, by the air turbulence control unit, a location of air turbulence within the air space based on the position signal. In at least one embodiment, the position signal is an automatic dependent surveillance-broadcast (ADS-B) signal.

In at least one embodiment, the air turbulence analysis method also includes storing aircraft data for the aircraft in an aircraft database, and correlating, by the air turbulence control unit, the position signal with the aircraft data to normalize the position signal.

In at least one embodiment, the air turbulence analysis method also includes analyzing one or more of a flight control signal received from the aircraft, a motion signal received from the aircraft, and weather data received from a weather reporting unit to assess the location of the air turbulence.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide air turbulence analysis systems and methods that monitor and analyze position signals of aircraft to determine locations of air turbulence within an air space. In at least one embodiment, the position signals are automatic dependent surveillance-broadcast (ADS-B) signals.

The systems and methods analyze position parameters (such as speed, altitude, heading, and/or the like) of one or more airborne aircraft to detect abnormalities that may be caused by air turbulence that the aircraft is experiencing. Additional data may be assessed to increase turbulence assessment accuracy. The additional data may include data received from flight controls, motion sensors, and weather reports, for example.

The systems and methods analyze objective data, such as position signals output by the aircraft, to determine locations of air turbulence. As such, embodiments of the present disclosure need not rely on reporting from pilots, weather reports, or the like to determine locations of air turbulence. The systems and methods may determine locations of air turbulence by assessing position signals output by multiple aircraft, and may assess air turbulence over large areas, and issue alerts or warnings well in advance to aircraft, thereby providing sufficient time for turbulence avoidance or mitigation.

As described herein, certain embodiments of the present disclosure provide an air turbulence analysis system that includes an air turbulence control unit that is configured to receive a position signal from an aircraft within an air space. The air turbulence control unit determines a location of air turbulence within the air space based on the position signal. In at least one embodiment, the position signal is an automatic dependent surveillance-broadcast (ADS-B) signal.

Certain embodiments of the present disclosure provide an air turbulence analysis method that includes receiving, by an air turbulence control unit, a position signal from an aircraft within an air space, and determining, by the air turbulence control unit, a location of air turbulence within the air space based on the position signal. In at least one embodiment, the position signal is an ADS-B signal.

Figure 1:
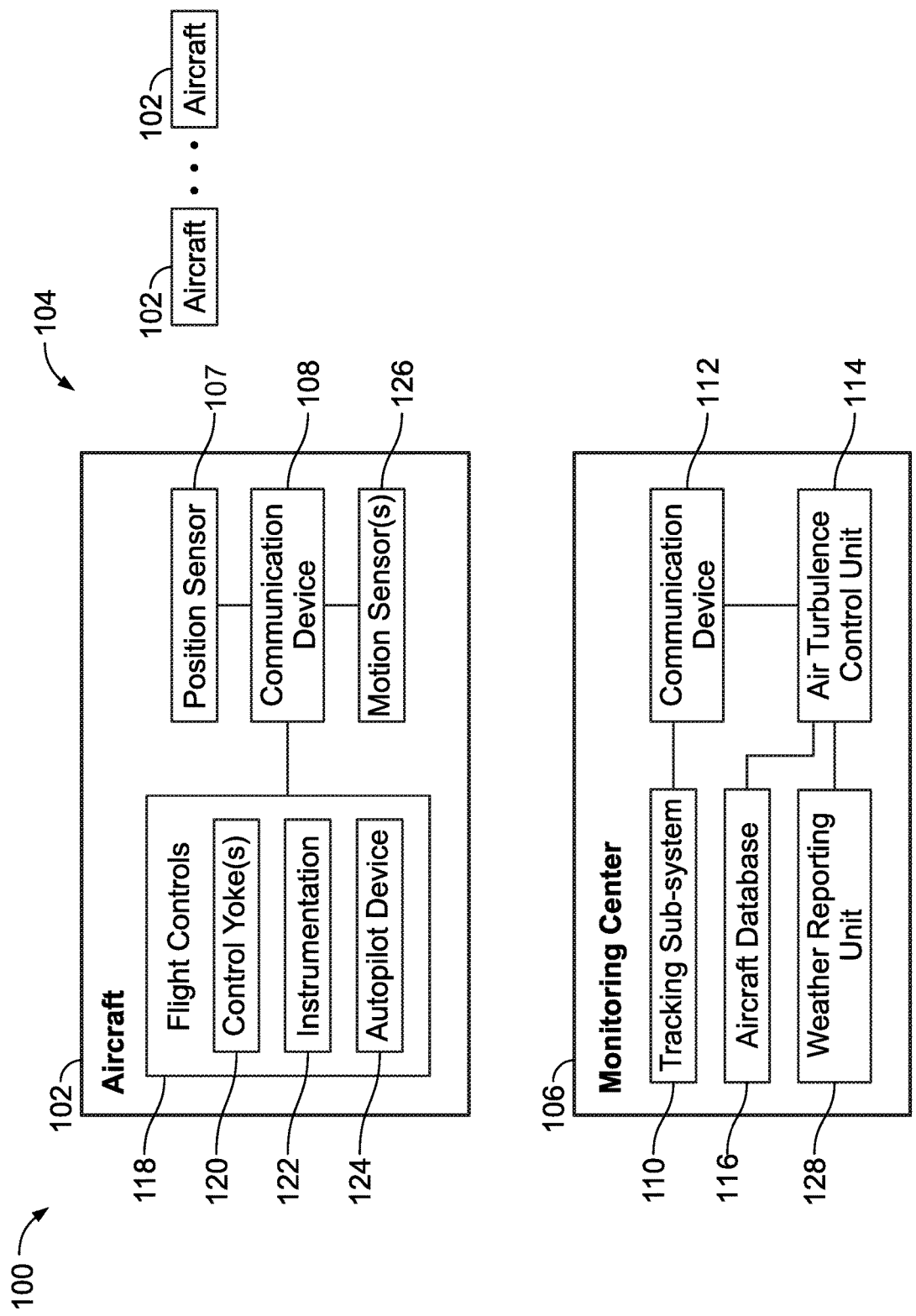
FIG. 1 illustrates a schematic block diagram of an air turbulence analysis system, according to an embodiment of the present disclosure.

FIG. 1 illustrates a schematic block diagram of an air turbulence analysis system 100, according to an embodiment of the present disclosure. The air turbulence analysis system 100 includes one or more aircraft 102 within an air space 104 in communication with a monitoring center 106. The air space 104 may be over a defined region, such as within a 500 mile radius from the monitoring center 106. Optionally, the air space 104 may be over a smaller or larger area than within a 500 mile radius from the monitoring center 106. As an example, the air space 104 may be over an entire hemisphere or even over an entire surface of the Earth.

In at least one embodiment, the monitoring center 106 is in communication with all aircraft 102 within the air space 104 to determine locations of air turbulence within the air space 104. By increasing the number of aircraft 102 within the air space 104 that are monitored by the monitoring center 106 to determine locations of air turbulence, the accuracy of the determined locations of air turbulence is increased. As such, the monitoring center 106 being in communication with all of the aircraft 102 within the air space 104 provides the most accurate assessment of locations of air turbulence within the air space 104. Alternatively, the monitoring center 106 may be in communication with less than all aircraft 102 within the air space 104 to determine locations of air turbulence within the air space 104. In at least one embodiment, the monitoring center 106 may be in communication with only one aircraft 102 within the air space 104 to determine locations of air turbulence within the air space 104.

Each aircraft 102 includes a position sensor 107 in communication with a communication device 108, such as through one or more wired or wireless connections. The position sensor 107 is configured to detect a current position of the aircraft 102 and output a position signal indicative of the current position of the aircraft 102. The position signal includes one or more position parameters, such as speed, altitude, heading, and the like.

The position signal output by the position sensor 107 of the aircraft 102 is received by a tracking sub-system 110 of the monitoring center 106 via a communication device 112, which is in communication with the tracking sub-system 110 through one or more wired or wireless connections. The tracking sub-system 110 tracks the current position of the aircraft 102 within the air space 104 through the received position signal received from the aircraft 102. The communication devices 108 and 112 may be one or more antennas, radio units, transceivers, receivers, transmitters, and/or the like.

In at least one embodiment, the position sensor 107 is an ADS-B sensor that communicates a current location to the monitoring center 106 via ADS-B signals, which may be output by the communication device 108. As such, the tracking sub-system 110 is an ADS-B tracking sub-system 110 that determines the current position of the aircraft 102 within the air space 104.

The monitoring center 106 may be an air traffic control center, such as at an airport. The monitoring center 106 may be land-based. In at least one other embodiment, the monitoring center 106 may be onboard an aircraft 102. In at least one other embodiment, the monitoring center 106 may be outside of the atmosphere of the Earth, such as within a space station, satellite, or the like.

The monitoring center 106 also includes an air turbulence control unit 114 in communication with the communication device 112 and/or the tracking sub-system 110 through one or more wired or wireless connections. The air turbulence control unit 114 analyzes the position signals received from the aircraft 102 to determine locations of air turbulence within the air space 104. The air turbulence control unit 114 analyzes one or more parameters of the position signal received from the aircraft 102 to assess whether or not the aircraft 102 is flying through air turbulence.

The air turbulence control unit 114 determines that the aircraft 102 is flying through air turbulence based on detected changes of one or more position parameters of the position signal (such as an ADS-B signal) over time. That is, the air turbulence control unit 114 determines the location of air turbulence within the air space 104 based on detected changes in the position parameter(s) of the position signal over time. For example, a change in speed that exceeds a predetermined speed change threshold (for example, +/−10 miles an hour) over time (for example, 5 or less seconds) causes the air turbulence control unit 114 to determine that the aircraft 102 is flying through air turbulence. Accordingly, the air turbulence control unit 114 may determine that the current location of the aircraft 102 is a location of air turbulence within the air space 104. The air turbulence control unit 114 may then output a turbulence alert or warning (such as an audio, video, graphic, text, or other signal that may be shown or broadcast to pilots) via the communication device 112 to all aircraft 102 within the air space, or aircraft 102 within a predetermined distance to the air turbulence. The turbulence alert or warning may optionally or additionally be sent to various other parties that are interested in the locations of air turbulence, such as ground based monitoring centers. The predetermined speed change threshold is an example of a predetermined position change threshold.

As another example, a change in altitude that exceeds a predetermined altitude change threshold (for example, +/−30 feet) over time (for example, 5 or less seconds) causes the air turbulence control unit 114 to determine that the aircraft 102 is flying through air turbulence. Accordingly, the air turbulence control unit 114 may determine that the current location of the aircraft 102 is a location of air turbulence within the air space 104. The air turbulence control unit 114 may then output a turbulence alert or warning (such as an audio, video, graphic, text, or other signal that may be shown or broadcast to pilots) via the communication device 112 to all aircraft 102 within the air space, or aircraft 102 within a predetermined distance to the air turbulence. The predetermined altitude change threshold is an example of a predetermined position change threshold.

As another example, a change in heading that exceeds a predetermined heading change threshold (for example, +/−5 degrees) over time (for example, 5 or less seconds) causes the air turbulence control unit 114 to determine that the aircraft 102 is flying through air turbulence. Accordingly, the air turbulence control unit 114 may determine that the current location of the aircraft 102 is a location of air turbulence within the air space 104. The air turbulence control unit 114 may then output a turbulence alert or warning (such as an audio, video, graphic, text, or other signal that may be shown or broadcast to pilots) via the communication device 112 to all aircraft 102 within the air space, or aircraft 102 within a predetermined distance to the air turbulence. The predetermined heading change threshold is an example of a predetermined position change threshold.

The air turbulence control unit 114 may analyze one position parameter (such as speed, altitude, or heading) to determine whether the location of the aircraft 102 is a location of air turbulence within the air space 104. In at least one other embodiment, the air turbulence control unit 114 may analyze multiple position parameters to determine whether the location of the aircraft 102 is a location of air turbulence within the air space 104. The air turbulence control unit 114 may base a determination of air turbulence through analysis of changes that exceed predetermined position thresholds of two or more of the position parameters. For example, the air turbulence control unit 114 may determine that a current location of the aircraft 102, as determined through the position signal output by the position sensor 107 of the aircraft 102, is a location of air turbulence by detecting a change in speed that exceeds a predetermined speed change threshold, and a change in altitude that exceeds a predetermined altitude change threshold. As another example, the air turbulence control unit 114 may determine that a current location of the aircraft 102, as determined through the position signal output by the position sensor 107 of the aircraft 102, is a location of air turbulence by detecting a change in speed that exceeds a predetermined speed change threshold, and a change in heading that exceeds a predetermined heading change threshold. As another example, the air turbulence control unit 114 may determine that a current location of the aircraft 102, as determined through the position signal output by the position sensor 107 of the aircraft 102, is a location of air turbulence by detecting a change in altitude that exceeds a predetermined altitude change threshold, and a change in heading that exceeds a predetermined heading change threshold. As another example, the air turbulence control unit 114 may determine that a current location of the aircraft 102, as determined through the position signal output by the position sensor 107 of the aircraft 102, is a location of air turbulence by detecting a change in speed that exceeds a predetermined speed change threshold, a change in altitude that exceeds a predetermined altitude change threshold, and a change in heading that exceeds a predetermined heading change threshold.

In at least one embodiment, the air turbulence control unit 114 is in communication with an aircraft database 116 through one or more wired or wireless connections. The aircraft database 116 may be within the monitoring center 106. The aircraft database 116 may store aircraft data for each of the aircraft 102 within the air space 104. The aircraft data may include aircraft identifier information regarding aircraft number, type, size, mass, maximum speed, and/or the like for each of the aircraft 102 within the air space 104. Because different types of aircraft 102 may experience air turbulence in a different manner, the air turbulence control unit correlates the received position signals received from the aircraft 102 with the aircraft data stored in the aircraft database 116 for each specific aircraft 102. In this manner, the air turbulence control unit 114 calibrates and/or otherwise normalizes the received position signals for all of the aircraft 102 within the air space 104. That is, the air turbulence control unit 114 accounts for the different types of aircraft 102, as determined from the stored aircraft data within the aircraft database 116, to assess locations of air turbulence based on the received position signals, as well as the particular type, size, shape, mass, and/or the like of the particular aircraft 102 from which the position signals are received.

As such, position data received from all aircraft 102 may be weighted and/or otherwise normalized so as to correlate changes in one or more position parameters of all aircraft 102 with a determination of air turbulence, regardless of type, size, weight, shape, mass, and/or the like of the aircraft 102. For example, a large, heavy aircraft 102 may experience air turbulence as moderate air turbulence, while a smaller, lighter aircraft 102 may experience the air turbulence as severe turbulence. The normalization of position signals received from the various aircraft 102 allows for an objective determination of air turbulence, and allows the severity of air turbulence to be categorized for different types of aircraft 102. In at least one embodiment, the normalization data may be stored in another component, such as a separate memory coupled to the air turbulence control unit 114, and/or a memory of the air turbulence control unit 114. Alternatively, the air turbulence analysis system 100 may not include the aircraft database, nor normalize position signals received from the aircraft 102 based on stored aircraft data.

The aircraft 102 also include flight controls 118, which may be in communication with the communication device 108 through one or more wired or wireless connections. The flight controls 118 may output flight control signals via the communication device 108, which are received by the air turbulence control unit 114 via the communication device 112. The air turbulence control unit 114 may refine an assessment of air turbulence in relation to the current position of the aircraft 102 within the air space 104 based on analysis of the received flight control signals. For example, the flight control signal(s) received from the aircraft 102 may be indicative of a pilot action that caused a change in at least one position parameter of the received position signal of the aircraft 102. As such, the air turbulence control unit 114 may not determine that the current location of the aircraft 102 within the air space 104 is a location of air turbulence.

The flight controls 118 may include one or more control yokes 120, instrumentation 122, and an autopilot device 124. The flight controls 118 may include more or less components than shown. For example, the flight controls 118 may not include the autopilot device 124.

In at least one embodiment, the flight control signal is indicative of a pilot action that causes a change in at least one position parameter of the position signal. For example, a pilot may engage the control yoke 120 and/or instrumentation 122, which causes a change in one or more position parameters of the current position of the aircraft 102. The engagement of the control yoke 120 and/or instrumentation 122 is received by the air turbulence control unit 114 as a flight control signal. The air turbulence control unit 114 assesses the received position signal from the position sensor 107 of the aircraft 102 in view of the received flight control signal. The air turbulence control unit 114 may determine that changes in one or more position parameters of the aircraft 102 are due to a pilot action, and not due to air turbulence. Therefore, the air turbulence control unit 114 may determine that the current location of the aircraft 102 is not a location of air turbulence within the air space 104.

In at least one embodiment, the flight control signal is indicative of an autopilot device operation that corrects a change in at least one position parameter of the position signal. For example, the received flight control signal may indicate that the autopilot device 124 is currently operating. The air turbulence control unit 114 may detect whether or not the autopilot device 124 is making corrections to maintain the aircraft 102 on a desired flight plan. The air turbulence control unit 114 may assess that the corrections exceed a corrections threshold over a period of time to determine whether or not the aircraft 102 is flying through air turbulence. For example, while the position signal received from the position sensor 107 of the aircraft 102 may not indicate any position parameters that exceed a predetermined positional change threshold, the air turbulence control unit 114 may determine that the corrections made by the autopilot device 124, as received from the flight control signal, indicate that the autopilot device 124 is actively correcting for what would otherwise be positional changes caused by air turbulence. Therefore, the air turbulence control unit 114 may still determine that the current location of the aircraft 102 is a location of air turbulence within the air space 104.

As indicated, the air turbulence control unit 114 may refine a determination of locations of air turbulence within the air space by analyzing one or more flight control signals received form the aircraft 102. That is, the air turbulence control unit 114 may determine a location of air turbulence within the air space 104 by analyzing the position signal and the flight control signal received from the aircraft 102. Alternatively, the air turbulence control unit 114 may not refine a determination of air turbulence based on analysis of the flight control signals.

In at least one embodiment, the air turbulence control unit 114 may determine or otherwise refine an assessment of air turbulence based on a flight plan of the aircraft 102. The flight plan for each aircraft 102 within the air space 104 may be stored in a memory that is coupled to the air turbulence control unit 114. For example, the flight plan for each aircraft 102 may be stored in the aircraft database 116. The air turbulence control unit 114 compares the position signals received from the aircraft 102 with the flight plans for the aircraft. The turbulence control unit 114 may determine locations of air turbulence within the air space 104 based on deviations of the current positions of the aircraft 102 (as indicated by the received position signals) from the flight plan for the aircraft 102. For example, changes of one or more position parameters of the aircraft 102 from the flight plan over time indicate that the current location of the aircraft 102 is a location of air turbulence within the air space 104. Optionally, the air turbulence control unit 114 may not analyze flight plans of the aircraft 102 to determine locations of air turbulence within the air space 104.

The aircraft 102 may also include one or more motion sensors 126, such as inertial motion sensors. The motion sensors 126 are in communication with the communication device 108 through one or more wired or wireless connections. The motion sensors 126 may include one or more of accelerometers, gyroscopes, and/or the like. The motion sensors 126 are configured to detect motion of the aircraft 102, and output motion signals that received by the air turbulence control unit 114 via the communication device 112.

The air turbulence control unit 114 may refine an assessment of air turbulence based on analysis of the received motion signals. For example, the air turbulence control unit 114 analyzes the position signal received from the aircraft 102 to determine whether or not the current position of the aircraft 102 is a location of air turbulence within the air space. The air turbulence control unit 114 may also analyze the received motion signals from the aircraft 102 as a redundancy check on the air turbulence determination. For example, the air turbulence control unit 114 may assign a turbulence assessment certainty metric based on agreement between assessment of the received position signal and the received motion signal. If the position signal and the motion signal conform to one another, then the air turbulence control unit 114 may assign a high degree of turbulence assessment certainty to its determination of air turbulence. If, however, the position signal and the received motion signal differ (for example, assessment of the position signal indicates no air turbulence, but the received motion signal indicates a significant amount of inertial motion of the aircraft 102), the air turbulence control unit 114 may assign a lower degree of turbulence assessment certainty, and/or analyze flight control signals output by the flight controls 118 to further refine the air turbulence assessment. Optionally, the air turbulence control unit 114 may not analyze motion signals output by the aircraft 102.

The air turbulence control unit 114 may refine an assessment of air turbulence based on analysis of received weather data at current locations of the aircraft 102 within the air space. A weather reporting unit 128 may be in communication with the air turbulence control unit 114, such as through one or more wired or wireless connections. The weather reporting unit 128 may be within the monitoring center 106. Optionally, the weather reporting unit 128 may be separate, distinct, and remote from the monitoring center 106. The air turbulence control unit 114 analyzes the position signal received from the aircraft 102 to determine whether or not the current position of the aircraft 102 is a location of air turbulence within the air space. The air turbulence control unit 114 may also analyze the weather data (as received via the weather data signal(s)) to assess the location of the air turbulence, such as determined based on an analysis of the position signal(s). Optionally, the air turbulence control unit 114 may not analyze weather data signals.

As described, each aircraft 102 flies within the air space 104 according to a flight plan. The aircraft 102 output their current positions via the position sensors 107, which output position signals indicative of the current positions. In at least one embodiment, the position signals are ADS-B signals. The position signals are received by the air turbulence control unit 114. The air turbulence control unit 114 bases determinations of locations of air turbulence within the air space 104 on the position signals. The air turbulence control unit 114 may refine assessments of air turbulence based on one or more of flight control signals received from the aircraft 102, motion signals received from the aircraft 102, and or weather data signals received from a weather reporting unit 128. As such, the air turbulence control unit 114 may base a determination of a location of air turbulence within the air space 104 on the position signal received from an aircraft 102, and one or more of a flight control signal received from the aircraft 102, a motion signal received from the aircraft 102, and/or a weather data signal received from the weather reporting unit 128.

In at least one embodiment, the air turbulence control unit 114 may determine locations of air turbulence within the air space 104, severity thereof, and probability of occurrence based on analysis of the position signals received from the position sensors 107 of the aircraft 102 flying within the air space 104. The air turbulence control unit 114 may store the determined locations of air turbulence within a memory, such as a database. Individuals (such as pilots, air traffic controllers, and/or the like) may request a turbulence advisory from the air turbulence control unit 114. The air turbulence control unit 114 may respond to the request by outputting determined locations air turbulence stored in the memory.

In at least one embodiment, the air turbulence control unit 114 may determine turbulence severity based on the magnitude of change of one or more position parameters over time. For example, a change in one or more position parameters that is below a predetermined low threshold may not be indicated as turbulence. A change in one or more position parameters that is between the predetermined low threshold and a predetermined moderate threshold may be indicated as low turbulence. A change in one or more position parameters that is between the predetermined moderate threshold and a predetermined high threshold may be indicated as moderate turbulence. A change in one or more position parameters that exceeds the predetermined high threshold may be indicated as high turbulence. The air turbulence control unit 114 may associate such turbulence severity with determined locations of air turbulence within the air space 104, and may output such determinations automatically to the aircraft 102, and/or upon request.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the air turbulence control unit 114 may be or include one or more processors that are configured to control operation thereof, as described herein.

The air turbulence control unit 114 is configured to execute a set of instructions that are stored in one or more data storage units or elements (such as one or more memories), in order to process data. For example, the air turbulence control unit 114 may include or be coupled to one or more memories. The data storage units may also store data or other information as desired or needed. The data storage units may be in the form of an information source or a physical memory element within a processing machine.

The set of instructions may include various commands that instruct the air turbulence control unit 114 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the air turbulence control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the air turbulence control unit 114 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
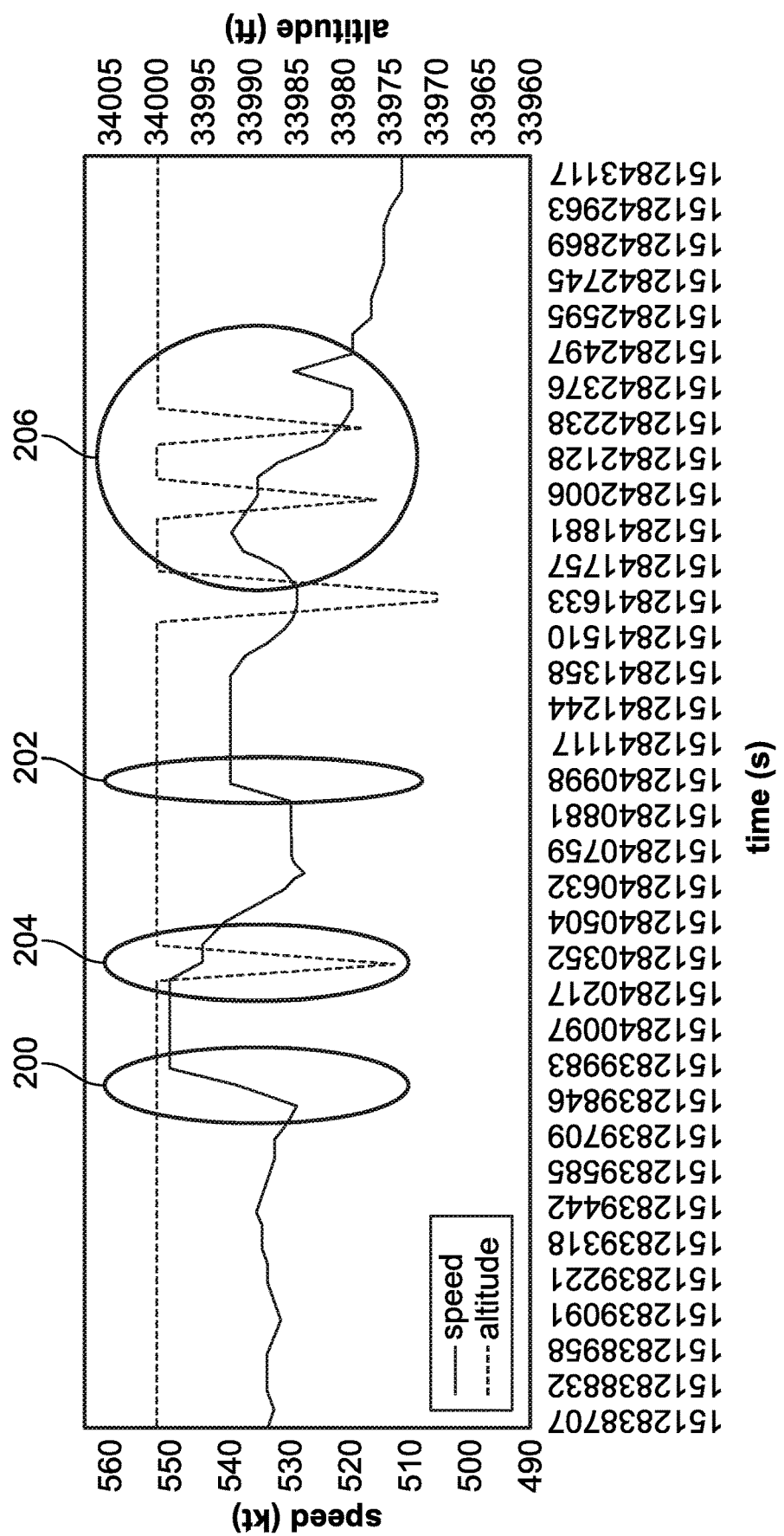
FIG. 2 illustrates a graph of speed and altitude of an aircraft over time, according to an embodiment of the present disclosure.

FIG. 2 illustrates a graph of speed and altitude of an aircraft over time, according to an embodiment of the present disclosure. Referring to FIGS. 1 and 2, the speed and altitude of the aircraft 102 are position parameters as received by the air turbulence control unit 114 from the aircraft 102 through the position signal. The air turbulence control unit 114 may determine locations of air turbulence based on a current position of the aircraft 102 during changes in aircraft 102 speed that exceed a predetermined speed change threshold, such as during time windows 200 and 202, changes in aircraft 102 altitude that exceed a predetermined altitude change threshold, such as during time window 204, or a combination of changes in aircraft 102 speed and changes in aircraft altitude that exceed respective predetermined speed and altitude change thresholds, such as during time window 206. The speed and altitude change thresholds that trigger the windows 200, 202, 204, and/or 206 may be greater or less than indicated in FIG. 2.

Figure 3:
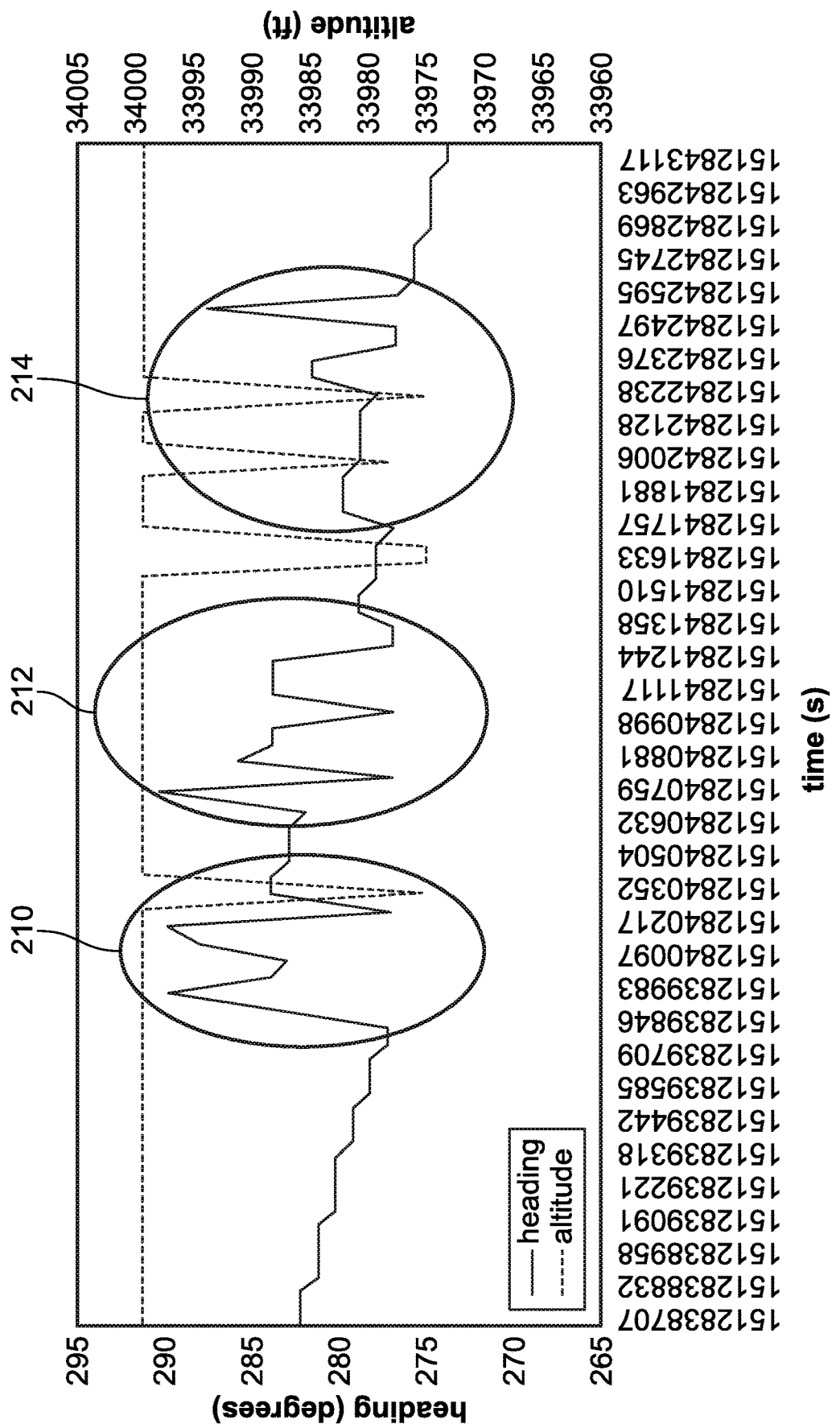
FIG. 3 illustrates a graph of heading and altitude of an aircraft over time, according to an embodiment of the present disclosure.

FIG. 3 illustrates a graph of heading and altitude of an aircraft over time, according to an embodiment of the present disclosure. Referring to FIGS. 1 and 3 the heading and altitude of the aircraft 102 are position parameters as received by the air turbulence control unit 114 from the aircraft 102 through the position signal. The air turbulence control unit 114 may determine locations of air turbulence based on a current position of the aircraft 102 during changes in aircraft 102 heading that exceed a predetermined heading change threshold, such as during time windows 210 and 212, changes in aircraft 102 altitude that exceed a predetermined altitude change threshold, or a combination of changes in aircraft 102 heading and changes in aircraft altitude that exceed respective predetermined speed and altitude change thresholds, such as during time window 214. The heading and altitude change thresholds that trigger the windows 210, 212, and/or 214 may be greater or less than indicated in FIG. 3.

Figure 4:
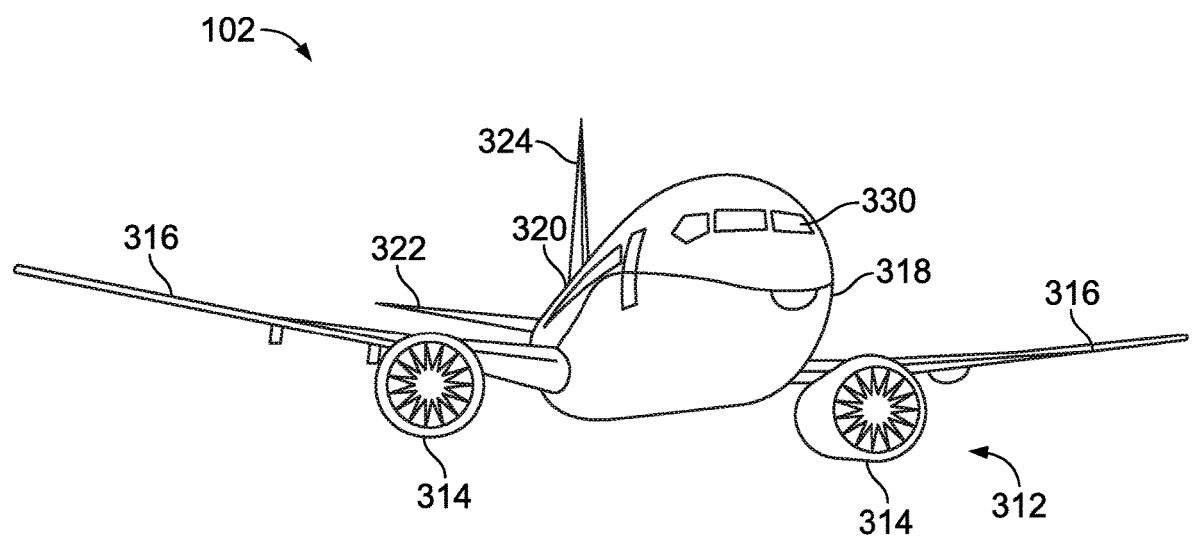
FIG. 4 illustrates a front perspective view of an aircraft, according to an exemplary embodiment of the present disclosure.

FIG. 4 illustrates a front perspective view of an aircraft 102, according to an exemplary embodiment of the present disclosure. The aircraft 102 includes a propulsion system 312 that may include two turbofan engines 314, for example. Optionally, the propulsion system 312 may include more engines 314 than shown. The engines 314 are carried by wings 316 of the aircraft 102. In other embodiments, the engines 314 may be carried by a fuselage 318 and/or an empennage 320. The empennage 320 may also support horizontal stabilizers 322 and a vertical stabilizer 324. The fuselage 318 of the aircraft 102 defines an internal cabin, which may include a cockpit 330, one or more work sections (for example, galleys, personnel carry-on baggage areas, and the like), one or more passenger sections (for example, first class, business class, and coach sections), and an aft section in which an aft rest area assembly may be positioned.

Figure 5:
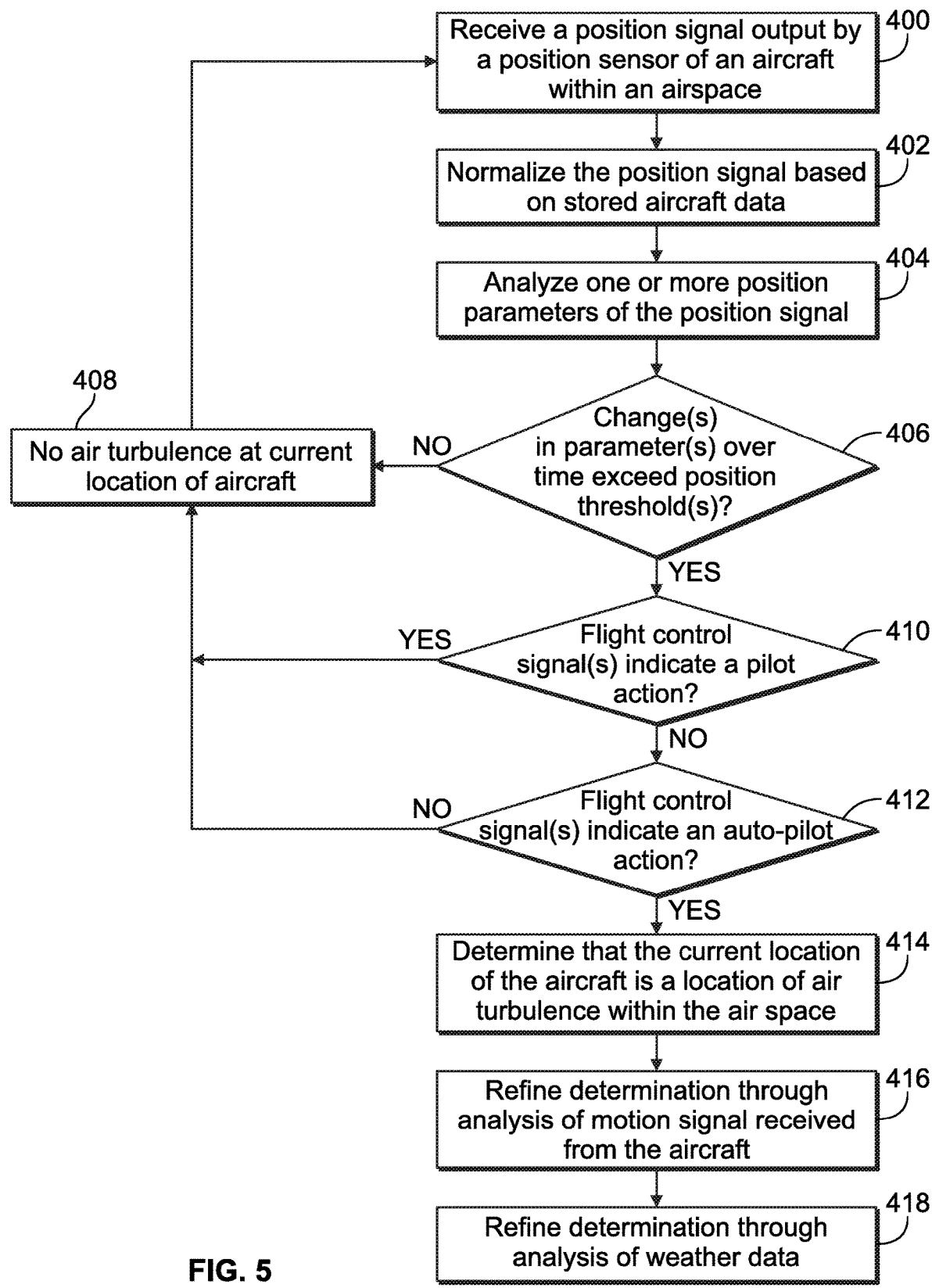
FIG. 5 illustrates a flow chart of an air turbulence analysis method, according to an embodiment of the present disclosure.

FIG. 5 illustrates a flow chart of an air turbulence analysis method, according to an embodiment of the present disclosure. Referring to FIGS. 1 and 5, the method begins at 400, at which a position signal is received (such as by the air turbulence control unit 114) output by the position sensor 107 of the aircraft 102 within the air space 104. At 402, the position signal may be normalized based on aircraft data, such as stored within the aircraft database 116. Alternatively, the method may not include 402.

At 404, one or more position parameters of the position signal are analyzed. The air turbulence control unit 114 analyzes the one or more position parameters, such as speed, heading, altitude, and the like.

At 406, it is determined whether there are changes in the position parameters that exceed predetermined position thresholds. If not, the method proceeds to 408, at which the air turbulence control unit 114 determines that there is no air turbulence at the current location of the aircraft 102 within the air space 104. The method then returns to 400.

If, however, it is determined that there are one or more changes in the position parameters over time that exceed one or more predetermined position thresholds at 406, the method proceeds to 410, at which the air turbulence control unit 114 determines whether flight control signal(s) indicate a pilot action that caused the changes in the position parameters. If so, the method proceeds to 408, and back to 410.

If the flight control signal(s) do not indicate a pilot action at 410, the method proceeds from 410 to 412, at which the air turbulence control unit 114 determines whether the flight control signal(s) indicate an auto-pilot action to correct for air turbulence. If at 412 the flight control signals do not indicate an auto-pilot action that corrects for air turbulence, the method proceeds from 412 to 408, and back to 400.

If, however, the flight control signal(s) indicate an auto-pilot action that corrects for air turbulence, the method proceeds from 412 to 414, at which the air turbulence control unit 114 determines that the current location of the aircraft is a location of air turbulence within the air space 104, and the method proceeds from 414 to 416. In at least one embodiment, the method may not include 410 and/or 412. Instead, the method may proceed directly from 406 to 414, from 406 to 412, or from 410 to 414 in response to the air turbulence control unit 114 determining that one or more changes in the position parameters over time exceed one or more predetermined position threshold(s).

At 416, the air turbulence control unit 114 may refine the determination through analysis of a motion signal received from the aircraft 102. Optionally, the method may not include 416.

At 418, the air turbulence control unit 114 may refine the determination through analysis of weather data. Optionally, the method may not include 418.

Referring to FIGS. 1-5, embodiments of the present disclosure provide systems and methods that allow large amounts of data to be quickly and efficiently analyzed by a computing device. For example, numerous aircraft 102 may be scheduled to fly within the air space 104. As such, large amounts of data are being tracked and analyzed. The vast amounts of data are efficiently organized and/or analyzed by the air turbulence control unit 114, as described herein. The air turbulence control unit 114 analyzes the data in a relatively short time in order to quickly and efficiently output and/or display information regarding air turbulence locations within the air space 104. For example, the air turbulence control unit 114 analyze current locations of the aircraft 102 received therefrom in real or near real time to determine locations of air turbulence within the air space 104. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described herein, embodiments of the present disclosure provide systems and methods for accurately and timely determining locations of air turbulence within an air space. Embodiments of the present disclosure provide objective systems and methods of determining air turbulence within an air space.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. An air turbulence analysis system, comprising:
an automatic dependent surveillance-broadcast (ADS-B) tracking sub-system configured to track a current position of an aircraft within an air space through an ADS-B signal from the aircraft; and
an air turbulence control unit in communication with the ADS-B tracking sub-system, wherein the air turbulence control unit is separate, distinct, and remote from the aircraft, wherein the air turbulence control unit determines a location of air turbulence within the air space in response to changes of position parameters of the ADS-B signal over time, wherein the position parameters comprise speed, altitude, and heading, wherein the air turbulence control unit is configured to:
determine one or more changes in the position parameters that exceed predetermined position thresholds,
determine whether one or more flight control signals indicate a pilot action that caused the one or more changes in response to determining that the one or more changes in the position parameters exceed the one or more predetermined position thresholds, and
determine whether the one or more flight control signals indicate an auto-pilot action to correct for the air turbulence in response to the one or more flight control signals not indicating that the pilot action caused the one or more changes.

2. The air turbulence analysis system of claim 1, wherein the air turbulence control unit determines that the aircraft is flying through air turbulence, at least in part, in response to a change in speed of the aircraft exceeding a predetermined speed change threshold.

3. The air turbulence analysis system of claim 1, wherein the air turbulence control unit determines that the aircraft is flying through air turbulence, at least in part, in response to a change in altitude of the aircraft exceeding a predetermined altitude change threshold.

4. The air turbulence analysis system of claim 1, wherein the air turbulence control unit determines that the aircraft is flying through air turbulence, at least in part, in response to a change in heading of the aircraft exceeding a predetermined heading change threshold.

5. The air turbulence analysis system of claim 1, wherein the air turbulence control unit determines that the aircraft is flying through air turbulence in response to two of a change in speed of the aircraft exceeding a predetermined speed change threshold, a change in altitude of the aircraft exceeding a predetermined altitude change threshold, and a change in heading of the aircraft exceeding a predetermined heading change threshold.

6. The air turbulence analysis system of claim 1, further comprising an aircraft database that stores aircraft data for the aircraft, wherein the air turbulence control unit correlates the ADS-B signal with the aircraft data to normalize the ADS-B signal.

7. The air turbulence analysis system of claim 6, wherein the air turbulence control unit categories a severity of the location of air turbulence based on the ADS-B signal that is correlated with the aircraft data.

8. The air turbulence analysis system of claim 1, wherein the air turbulence control unit is further configured to receive a flight control signal from the aircraft, and wherein the air turbulence control unit analyzes the flight control signal to assess the location of the air turbulence.

9. The air turbulence analysis system of claim 8, wherein the flight control signal is indicative of the pilot action that caused a change in at least one of the position parameters.

10. The air turbulence analysis system of claim 8, wherein the flight control signal is indicative of an autopilot device operation that corrected a change in at least one of the position parameters.

11. The air turbulence analysis system of claim 8, wherein the air turbulence control unit receives a motion signal from one or more motion sensors of the aircraft, and wherein the air turbulence control unit analyzes the flight control signal to assess the location of the air turbulence.

12. The air turbulence analysis system of claim 1, wherein the air turbulence control unit compares the ADS-B signal to a flight plan of the aircraft.

13. The air turbulence analysis system of claim 1, wherein the air turbulence control unit receives weather data from a weather reporting unit, and wherein the air turbulence control unit analyzes the weather data to assess the location of the air turbulence.

14. The air turbulence analysis system of claim 1, wherein the air turbulence control unit determines that the aircraft is flying through air turbulence in response to a change in speed of the aircraft exceeding a predetermined speed change threshold, a change in altitude of the aircraft exceeding a predetermined altitude change threshold, and a change in heading of the aircraft exceeding a predetermined heading change threshold.

15. The air turbulence analysis system of claim 1, wherein the position parameters consist of speed, altitude, and heading.

16. The air turbulence analysis system of claim 1, wherein the air turbulence control unit determines the location of air turbulence within the air space in response to changes of each of and all of the position parameters at a given time.

17. An air turbulence analysis method, comprising:
   tracking, by an automatic dependent surveillance-broadcast (ADS-B) tracking sub-system, a current position of an aircraft within an air space through an ADS-B signal from the aircraft;
   receiving, by an air turbulence control unit that is separate, distinct, and remote from the aircraft, the ADS-B signal from the aircraft within the air space;
   determining, by the air turbulence control unit, a location of air turbulence within the air space in response to changes of position parameters of the ADS-B signal over time, wherein the position parameters comprise speed, altitude, and heading;
   determining one or more changes in the position parameters that exceed predetermined position thresholds,
   determining whether one or more flight control signals indicate a pilot action that caused the one or more changes in response to determining that the one or more changes in the position parameters exceed the one or more predetermined position thresholds, and
   determining whether the one or more flight control signals indicate an auto-pilot action to correct for the air turbulence in response to the one or more flight control signals not indicating that the pilot action caused the one or more changes.

18. The air turbulence analysis method of claim 17, further comprising:
   storing aircraft data for the aircraft in an aircraft database; and
   correlating, by the air turbulence control unit, the ADS-B signal with the aircraft data to normalize the ADS-B signal.

19. The air turbulence analysis method of claim 17, further comprising analyzing the flight control signal received from the aircraft, a motion signal received from the aircraft, and weather data received from a weather reporting unit to assess the location of the air turbulence.

20. The air turbulence analysis method of claim 17, wherein the determining comprises determining that the aircraft is flying through air turbulence, at least in part, in response to a change in speed of the aircraft exceeding a predetermined speed change threshold.

21. The air turbulence analysis method of claim 17, wherein the determining comprises determining that the aircraft is flying through air turbulence, at least in part, in response to a change in altitude of the aircraft exceeding a predetermined altitude change threshold.

22. The air turbulence analysis method of claim 17, wherein the determining comprises that the aircraft is flying through air turbulence in response to a change in speed of the aircraft exceeding a predetermined speed change threshold, a change in altitude of the aircraft exceeding a predetermined altitude change threshold, and a change in heading of the aircraft exceeding a predetermined heading change threshold.

23. The air turbulence analysis method of claim 17, wherein the position parameters consist of speed, altitude, and heading.

24. The air turbulence analysis method of claim 17, wherein said determining comprises determining, by the air turbulence control unit, the location of air turbulence within the air space in response to changes of each and all of the position parameters at a given time.

25. An air turbulence analysis system, comprising:
   an automatic dependent surveillance-broadcast (ADS-B) tracking sub-system configured to track a current position of an aircraft within an air space through an ADS-B signal from the aircraft; and
   an air turbulence control unit in communication with the ADS-B tracking sub-system, wherein the air turbulence control unit is configured to:
      determine one or more changes in position parameters that exceed predetermined position thresholds,
      determine whether one or more flight control signals indicate a pilot action that caused the one or more changes in response to determining that the one or more changes in the position parameters exceed the one or more predetermined position thresholds, and
      determine whether the one or more flight control signals indicate an auto-pilot action to correct for the air turbulence in response to the one or more flight control signals not indicating that the pilot action caused the one or more changes.

* * * * *